E. FUCHS, Jr.
PISTON CONNECTION.
APPLICATION FILED DEC. 11, 1917.
1,284,300.
Patented Nov. 12, 1918.
Fig. 1.
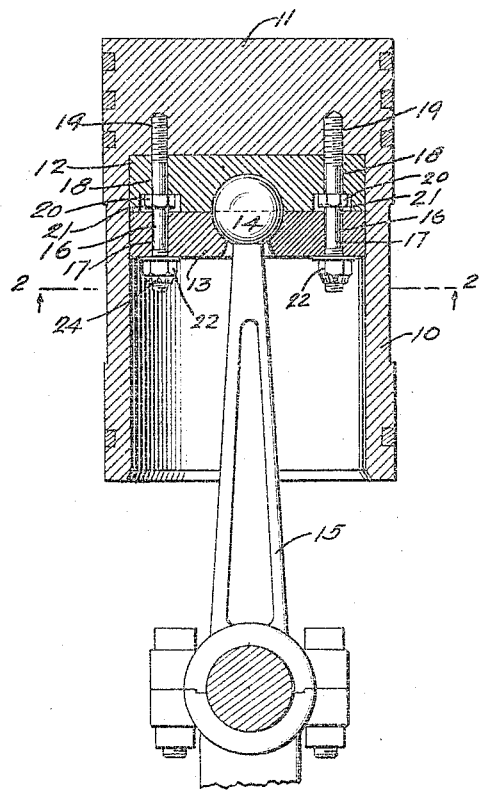
Fig. 4.
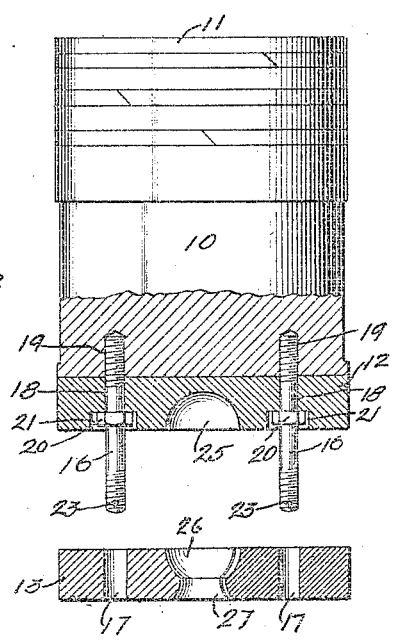
Fig. 2.
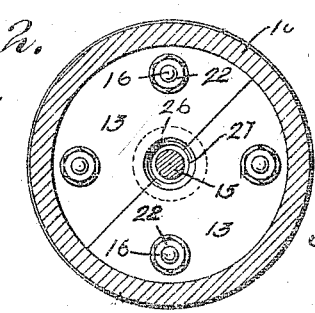
Fig. 3.
Fig. 5.
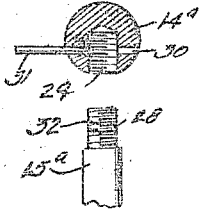
WITNESSES
INVENTOR
Ernest Fuchs jr.
BY
ATTORNEYS

UNITED STATES PATENT OFFICE.

ERNEST FUCHS, JR., OF CAMP LEE, VIRGINIA.

PISTON CONNECTION.

1,284,300.  Specification of Letters Patent.  Patented Nov. 12, 1918.

Application filed December 11, 1917. Serial No. 206,687.

*To all whom it may concern:*

Be it known that I, ERNEST FUCHS, Jr., a citizen of the United States, at present stationed and residing in Camp Lee, in the county of Prince George and State of Virginia, have invented a new and Improved Piston Connection, of which the following is a full, clear, and exact description.

My invention while adapted for use in connecting drive rods generally with the elements to be driven, is more particularly intended for use as a means of connecting the piston and piston rod of an internal combustion engine, whereby to promote flexibility and an even distribution of pressure, as well as to enable the piston to properly aline itself with the direction of thrust and effect an even wear, on the piston, piston rings and cylinder.

In carrying out my invention a ball and socket connection is established between the drive rod and driven element, and for the purpose use is made of a novel arrangement of clamp plates presenting a socket associated with the piston or other driven element, and a novel arrangement of bolts to clamp the socket plates to the driven element and to a ball provided on the piston rod or like drive rod.

Reference is to be had to the accompanying drawings forming a part of this specification in which similar reference characters indicate corresponding parts in all the views, it being understood that the drawings are merely illustrative of one example of the invention.

Figure 1 is a longitudinal sectional view of a piston and piston rod having my improved connection;

Fig. 2 is a transverse section on the line 2—2, Fig. 1;

Fig. 3 is a rear face view of a sectional plate forming a part of the connecting means;

Fig. 4 is a partly sectional side elevation of the piston and the partially assembled clamp plates associated therewith and their securing bolts;

Fig. 5 is a detail view of a detachable ball for the drive rod and means for securing the same in position on the drive rod shown in part.

The numeral 10 indicates a trunk piston of an internal combustion engine and 15 the piston rod. In carrying out my invention I apply to the rear face of the head 11 of the piston, a plate 12 associated with which is a plate designated generally by the numeral 13 which is formed in two sections by dividing the plate centrally as best seen in Figs. 2 and 3. On the piston rod 15 I provide a ball head 14 which may be integral with said rod or separate therefrom as shown in Fig. 5 and designated 14ª.

The plates 13, 12 are formed with alined bolt holes 17, 18 which receive clamp bolts 16. Each bolt is double-ended, the forward end of the bolt projecting through and beyond the plate 12 and being threaded and engaging a threaded hole 19 in the piston head 11 or other driven element. On each bolt between the ends thereof is provided means to receive a wrench and to provide a shoulder to bear against the rear side of the plate 12 which plate is placed directly against the piston head 11. In the form shown a polygonal enlargement 20 is provided on the bolt for taking the wrench and to present a forward shoulder which bears against the plate 12 at the bottom of a depression 21 in said plate, which accommodates the said enlargement. The rear ends of the bolts 16 extend rearwardly beyond the sections of the plate 13 and are threaded to receive nuts 22. The nuts are of the type to be locked by a cotter pin for which purpose the bolts have transverse pin holes 23 and the usual slots or recesses 24 are produced in the nut to receive a cotter pin (not shown). Any other approved means may be provided to lock the nut as will be readily understood.

The plates 12, 13 present a socket to receive the ball 14 or 14ª for which purpose a concave depression is formed in the rear face of the plate 12 and an opposed concave depression 26 is produced in the plate 13. A throat 27 leads through the plate 13 to the depression 26 and is flared to accommodate the varied positions of piston rod 15. The plate 13, being divided in the center, divides the depression 26 and throat 27 so that the said depression in the assembled sections will be presented in proper relation to the depression 25 of the socket and to the ball 14.

The described construction establishes a flexible connection between the piston and rod, enabling the piston to accommodate itself to the direction of pressure, and equalizes the wear on the parts.

To detachably secure the head 14ª to the piston rod 15ª as in Fig. 5, said rod has a threaded tenon 28 to be received in a threaded hole 29 in the ball. Said ball has a transverse pin hole 30, there being a similar pin hole as indicated in dotted lines at 32 in the tenon 28 to receive the locking pin 31.

I wish to state in conclusion that although the illustrated example constitutes a practical embodiment of my invention, I do not limit myself strictly to the mechanical details herein illustrated, since manifestly the same can be considerably varied, without departure from the spirit of the invention as defined in the appended claim.

Having thus described my invention, I claim as new, and desire to secure by Letters Patent:

A means to connect a drive rod with an element to be driven such as a piston, said means including a ball forming the terminal for a drive rod, front and rear plates juxtaposed and having opposite concave depressions in their opposed faces constituting a socket conforming to said ball, there being a throat in the rear plate leading to the socket for the accommodation of a drive rod, said rear plate being in sections dividing the plate at the throat and depressions, the sections having bolt holes therethrough, and the front plate having bolt holes therethrough which are alined with the bolt holes of the rear plate and formed with countersunk recesses at the rear face of the bolt holes, double-ended bolts having enlargements between the ends thereof accommodated in said counter-sunk recesses, the said enlargements being adapted to receive a wrench and presenting shoulders to bear against the front plate, the said bolts forward of the enlargements extending through the bolt holes of the front plate and presenting projecting threaded ends adapted to be engaged with the element to be driven, the said bolts rearward of the enlargements extending through and beyond the bolt holes in the sections of the rear plate and presenting threads, and nuts on the threaded rear ends of the bolts.

ERNEST FUCHS, Jr.